US010219587B1

(12) United States Patent
Chan et al.

(10) Patent No.: US 10,219,587 B1
(45) Date of Patent: Mar. 5, 2019

(54) ATTACHMENT SYSTEM WITH A CONNECTED ARTICLE

(71) Applicant: Duraflex Hong Kong Limited, Hong Kong (CN)

(72) Inventors: Yick Fai Chan, Hong Kong (CN); Ying Kwan Wong, Hong Kong (CN)

(73) Assignee: Duraflex Hong Kong Limited, Hong Kong (CN)

( * ) Notice: Subject to any disclaimer, the term of this patent is extended or adjusted under 35 U.S.C. 154(b) by 0 days.

(21) Appl. No.: 15/695,218

(22) Filed: Sep. 5, 2017

(51) Int. Cl.
*A44B 11/00* (2006.01)
*F16G 11/08* (2006.01)
*F16G 11/04* (2006.01)
*A44B 11/04* (2006.01)
*A44B 11/25* (2006.01)

(52) U.S. Cl.
CPC ............ *A44B 11/005* (2013.01); *A44B 11/04* (2013.01); *A44B 11/2592* (2013.01); *F16G 11/046* (2013.01); *F16G 11/08* (2013.01); *A44D 2201/04* (2013.01)

(58) Field of Classification Search
CPC ... A44B 11/005; A44B 11/04; A44B 11/2592; F16G 11/046; F16G 11/08; A44D 2201/04
See application file for complete search history.

(56) References Cited

U.S. PATENT DOCUMENTS

| 4,914,790 A * | 4/1990 | Foubert | A44C 5/18 24/606 |
| 6,185,794 B1 * | 2/2001 | Maggi | A63B 31/11 24/170 |
| 6,668,428 B2 | 12/2003 | Moeller | |
| 8,191,213 B2 * | 6/2012 | Anscher | A44B 11/266 24/606 |

(Continued)

FOREIGN PATENT DOCUMENTS

| CN | 104287321 A | 1/2015 |
| JP | 2013-075064 A | 4/2013 |
| JP | 5852801 B2 | 2/2016 |
| WO | 2013/015200 A1 | 1/2013 |

OTHER PUBLICATIONS

International Search Report of corresponding International Application No. PCT/CN2018/099897, dated Nov. 1, 2018.

*Primary Examiner* — Victor D Batson
*Assistant Examiner* — Rowland Do
(74) *Attorney, Agent, or Firm* — Collard & Roe, P.C.

(57) ABSTRACT

An attachment system is formed by a primary device and a secondary device connected to the primary device in a pivoting manner. The primary device has a main body, two lateral sides and a bar for attaching the primary device to another object. Each of the lateral sides has a protrusion extending laterally outward from the lateral sides. The secondary device has two lateral sides, each equipped with an aperture that corresponds to one of the protrusions on the primary device, so that fitting the protrusions into the (Continued)

apertures pivotally connects the primary device to the secondary device, with the lateral sides of the secondary device being disposed outside of the lateral sides of the primary device. The secondary device can be pivoted between a folded position where the secondary device lies against the primary device, and an open position where the secondary device is raised up.

10 Claims, 4 Drawing Sheets

(56) References Cited

U.S. PATENT DOCUMENTS

| | | |
|---|---|---|
| 2002/0029440 A1* | 3/2002 | Moeller ............... A44B 11/001 24/163 R |
| 2005/0198789 A1* | 9/2005 | Wang .................. A44B 19/262 24/429 |
| 2006/0080811 A1* | 4/2006 | Grimm .............. A44B 11/2592 24/615 |
| 2007/0090136 A1 | 4/2007 | Stowell et al. |
| 2007/0171629 A1 | 7/2007 | Langenwalter |
| 2010/0115736 A1* | 5/2010 | Paik ..................... A44B 11/005 24/163 R |
| 2014/0109615 A1* | 4/2014 | Millan ..................... B26B 9/00 63/1.12 |
| 2014/0367426 A1 | 12/2014 | Yen |
| 2016/0360837 A1 | 12/2016 | Costenbader |
| 2017/0020234 A1* | 1/2017 | Taylor ................. A44B 11/005 |

* cited by examiner

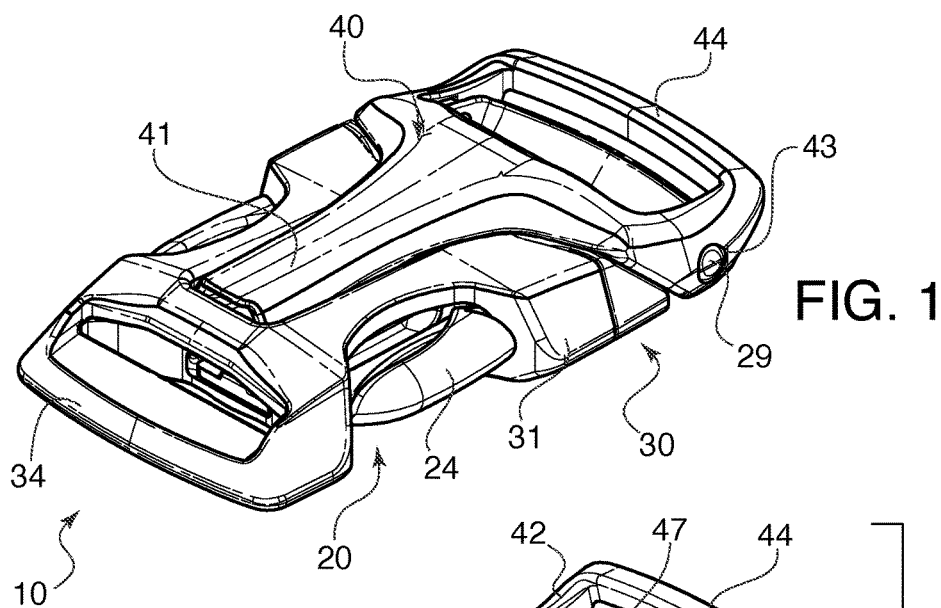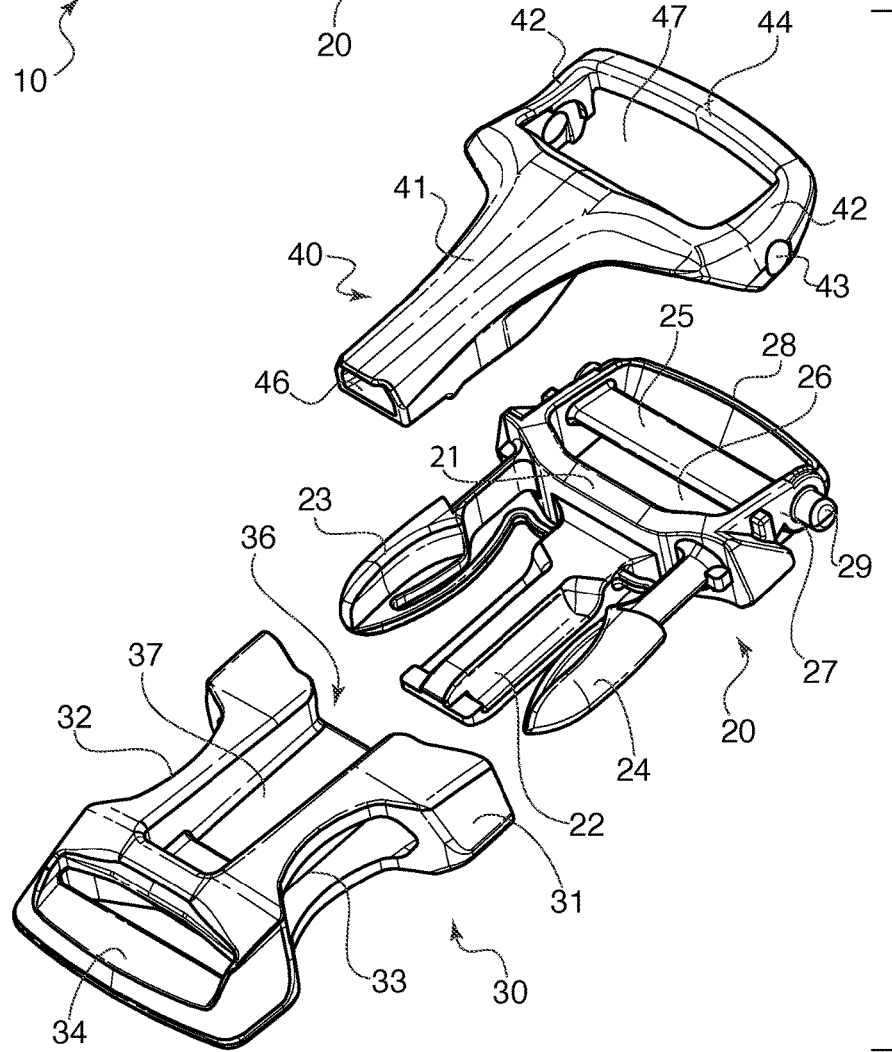

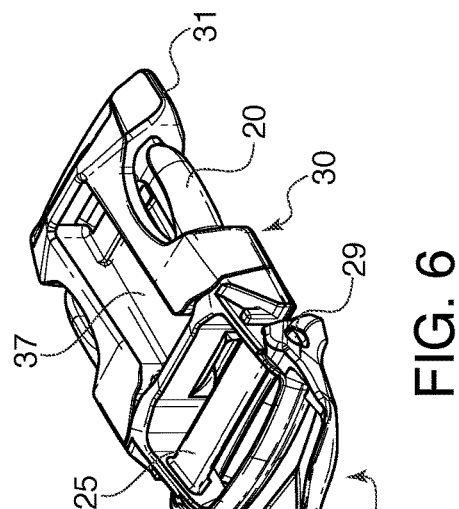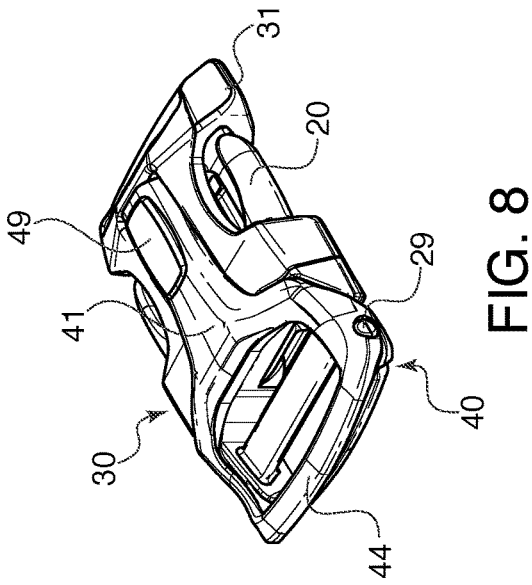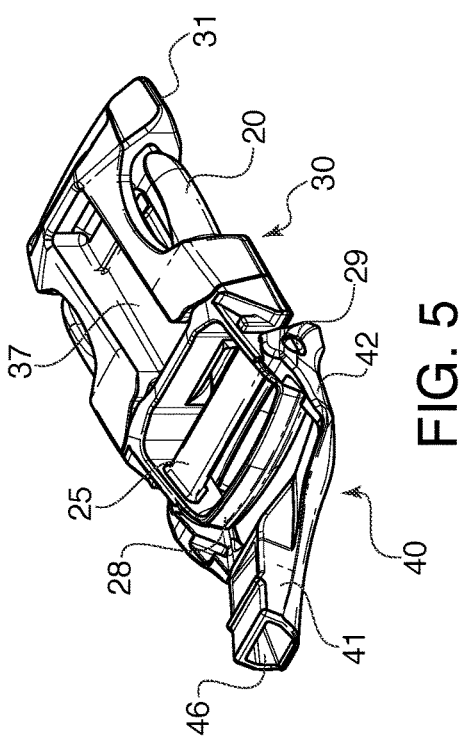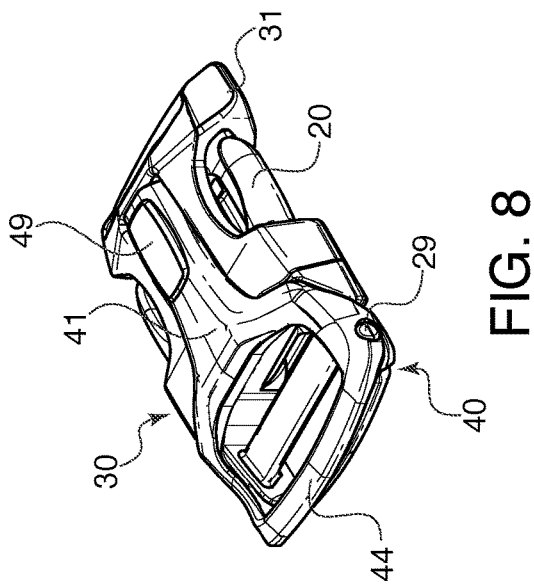

ATTACHMENT SYSTEM WITH A CONNECTED ARTICLE

BACKGROUND OF THE INVENTION

1. Field of the Invention

The present invention relates to a buckle or other attachment system having an article attached to the buckle. In particular, the invention relates to a buckle in which an article is pivotally connected to the buckle, so that the article can be pivoted into a useful position and then pivoted back against the buckle when not in use.

2. The Prior Art

It is often desirable to attach articles such as clips lights and whistles to buckles or other attachment devices, to improve their utility. U.S. Pat. No. 6,668,428 to Moeller shows a buckle having a whistle integrally formed therewith. The whistle is formed at an end of the female member and extends crosswise across the buckle. The problem with this single piece arrangement is that if the additional device is damaged, the whole buckle has to be replaced.

JP5852801B2 shows a whistle pivotally connected to a buckle. This whistle is connected to the female portion of the buckle and is embedded in a recess on one side of the buckle. Other variations show the whistle embedded in other portions of various securing mechanisms. The problem with these devices having the embedded accessories is that it is very difficult for the user to find and also open the device, especially in the circumstances when the user can only use their hand to find the buckle without seeing it, such as when the buckle is used on the sternum strap of a backpack. In addition, either one of the legs or the center guidance of the male buckle has to be eliminated in order to house the whistle. In this case, the strength of the connection and the stability of the buckle is unavoidably affected.

SUMMARY OF THE INVENTION

It is therefore an object of the invention to provide a buckle or other attachment system that can hold a secondary device that is a separate part and can be replaceable. It is another object of the invention to provide an attachment system in which the secondary device does not interfere with the functioning of the primary device.

This object is accomplished by an attachment system comprising a primary device and a secondary device connected to the primary device in a pivoting manner. The primary device has a main body, a front, a rear, two lateral sides and a bar for attaching the primary device to another object. Each of the lateral sides has a protrusion extending laterally outward from the lateral sides. The secondary device has two lateral sides and a top bar connecting the two lateral sides. Each of the lateral sides is equipped with an aperture that corresponds to one of the protrusions on the primary device, so that fitting the protrusions into the apertures pivotally connects the primary device to the secondary device, with the lateral sides of the secondary device being disposed outside of the lateral sides of the primary device. The secondary device can be pivoted between a folded position where the secondary device lies against the primary device, and an open position where the secondary device is raised up from the primary device. The secondary device can be rotation about a wide angle, without affecting the position of the buckle.

The secondary device preferably has an elongated section extending from the lateral sides and opposite the bar. The elongated section terminates in a free end that in the open position is pivoted away from the primary device. The elongated section contains the operative features of the secondary device. The secondary device can include any one of several different operative features, such as a whistle, luminous device, security lock, or thermal sensor.

In a preferred embodiment, the primary device is a two-piece buckle, with a male portion and a female portion, and in particular, a side-release buckle in which locking legs of the male portion protrude through side slots in the female portion. The secondary device is connected to the exterior of the lateral sides of the male portion. The female portion has a front side and a rear side, and the front side has an indentation corresponding to a shape of the secondary device, so that in a folded position, the secondary device rests in the indentation of the female portion. When the secondary device is closed, it lays on the top surface of the buckle in the indentation. Part of the secondary device is hidden and is surrounded by the buckle, and as a result protection to the critical part of the secondary device is formed. In addition, in this design, the male buckle portion has both legs and a center guidance piece, so that the strength and stability is maintained, even with the addition of the secondary device.

Preferably, the top bar of the secondary device extends beyond a top edge of the male portion, so that pressing down on the bar causes the secondary device to pivot from a folded position to an open position. This eliminates the need for the user to pry up the free end of the secondary device in order to use it.

The primary device can also take the form of other attachment devices, such as a D-ring, strap adjuster, cord lock or cord end. When a cord lock or cord end is used, instead of a bar to attach the cord, these elements have an aperture in which the cord is locked.

The present invention has many benefits over prior devices. For example, since the secondary device is a separate part and can be replaceable, the user can have an option to change the device with another secondary device based on the user's need. The secondary device is placed on top of the primary device, so the user can easily detect the location of the device and open it. In addition, the location of the secondary device does not affect the structure or operation of the primary device. The user can raise the secondary device to the raised position and have full access to all sides of the primary device for attachment to a strap or other item.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows the attachment system according to the invention fully assembled in a folded position;

FIG. 2 shows an exploded view of all of the components of the system;

FIG. 5 shows the attachment system with a secondary device in the form of a whistle;

FIG. 6 shows the attachment system with a secondary device in the form of a luminous device;

FIG. 7 shows the attachment system with a secondary device in the form of a security lock;

FIG. 8 shows the attachment system with a secondary device in the form of a thermal sensor;

DETAILED DESCRIPTION OF THE PREFERRED EMBODIMENT

Figure 3:
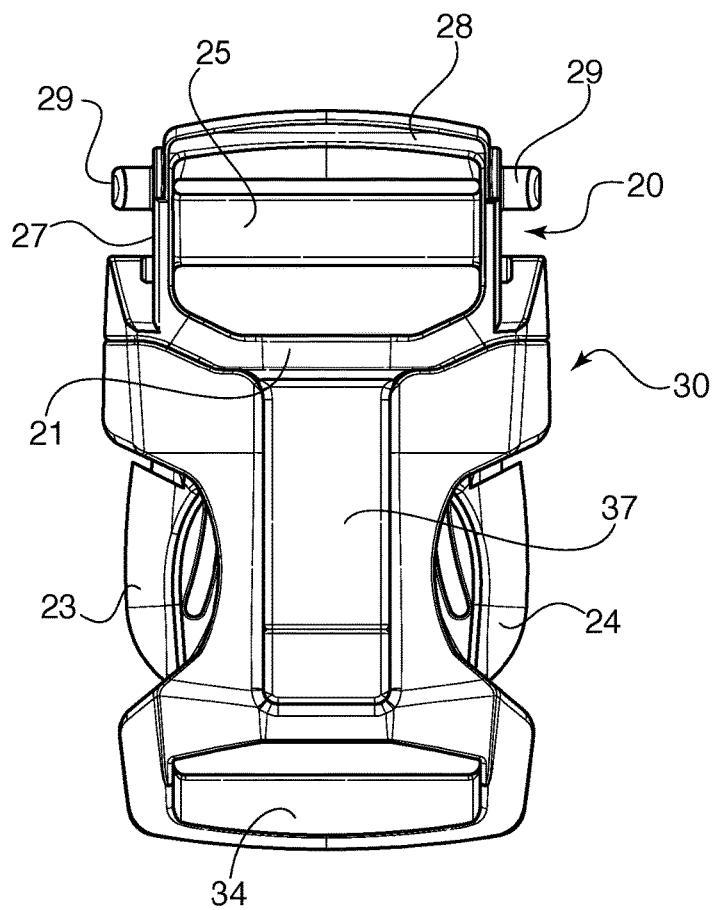
FIG. 3 shows the male and female buckle parts assembled without the secondary device.
Figure 4:
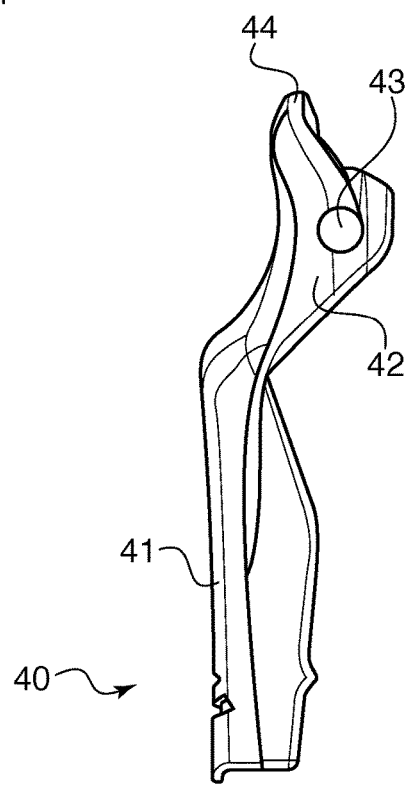
FIG. 4 shows a side view of the secondary device.

Referring now in detail to the drawings, FIGS. 1-5 show a first embodiment of the system 10 according to the invention. System 10 comprises a buckle having a male portion 20, a female portion 30, and a secondary device 40 in the form of a whistle. Male portion 20 is formed of a main body 21 with a central guide 22, two locking legs 23, 24, an attachment bar 25 spanning an opening 26 bounded by side walls 27, and a top edge 28. On each side wall 27 is a protrusion 29 extending outwardly.

Female portion 30 is formed of a hollow main body 31 having openings 32, 33 for receiving locking legs 23, 24 and an attachment bar 34 at its end. An opening 36 receives male portion 20 to lock male portion 20 to female portion 30 when locking legs 23, 24, snap into openings 32, 33. Guide flanges (not shown) are disposed inside female portion 30 to guide central guide 22 of male portion 20 as it is inserted into female portion 30. A longitudinal indentation 37 runs down the length of female portion 30 and is configured to receive main body 41 of secondary device 40.

Secondary device 40 has side walls 42 connected to main body 41, and a top bar 44 connecting side walls 42, with an opening 47 in between side walls 42. On each side wall 42 is an aperture 43, which is sized to receive a respective one of the protrusions 29 of male portion 20, to attach secondary device 40 to male portion 20. As shown in FIG. 1, placing secondary device 40 over male portion 20 and snapping protrusions 29 into apertures 43 connects secondary device 40 to male portion 20 in a pivoting manner. Main body 41 of secondary device 40 rests in indentation 37 of female portion 30 when secondary device 40 is in the folded position as shown in FIG. 1. This protects the end and bottom side of the secondary device from damage during use.

FIG. 5 shows secondary device 40 in an open position so that secondary device can be operable. The hinge arrangement shown allows a wide range of pivoting, up to 180° or more. In FIGS. 1-5, secondary device 40 is in the form of a whistle 46. This is useful as a rescue device, especially when applied to backpacks or life jackets. In order to open secondary device 40 from the folded position to the raised position, the user merely has to press down on top bar 44, which causes secondary device 40 to pivot out of the folded position where it is ready for use. The configuration of secondary device 40 does not interfere with the function or structure of male and female portions 20, 30, because it is attached to the exterior of male portion 20 and fits over the buckle portions, while allowing their normal functions.

Secondary device 40 can take on many different configurations. As shown in FIG. 6, secondary device 40 can be in the form of a luminous device 47. This is also useful as a rescue device, especially when applied to life jackets or backpacks. Luminous device 47 can be equipped with a switch that turns it on automatically once secondary device 40 is moved to the raised position, or can have a manual switch. As shown in FIG. 7, secondary device 40 can be in the form of a security lock 48. This is particularly useful on military or police equipment. As shown in FIG. 8, secondary device 40 can also be in the form of a thermal sensor 49. This has a special applicability to baby carriers, to provide a signal to caregivers of a temperature change. Other devices could also be incorporated into secondary device 40.

Figure 9:
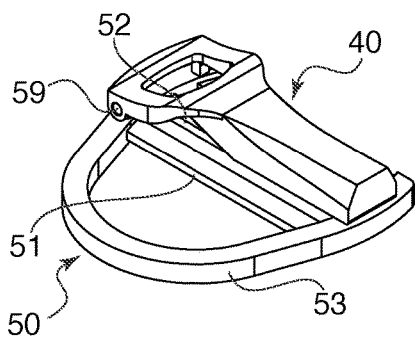
FIG. 9 shows an alternative attachment system with the primary device being a D-ring.

In addition to varying secondary device 40, the primary device itself can take on other forms. Instead of a side-release buckle, the primary device can take the form of a D-ring, as shown in FIG. 9. In this case, secondary device 40 snaps into protrusions 59 that are disposed on either side of strap retaining bars 51, 52, and can be pivoted up and away from the D-ring 50 when in use.

Figure 10:
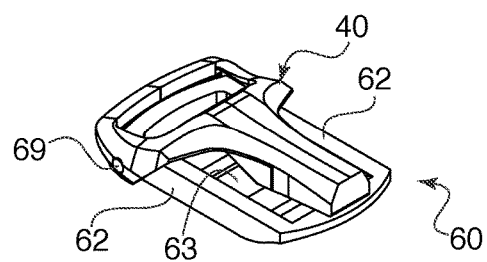
FIG. 10 shows the attachment system with the primary device being a tension lock strap holder.

FIG. 10 shows another variation, in which secondary device 40 is snapped onto protrusions 69 in the exterior sidewalls 62 of a tension lock strap retainer 60, having strap retaining bar 63 in its interior.

Figure 11:
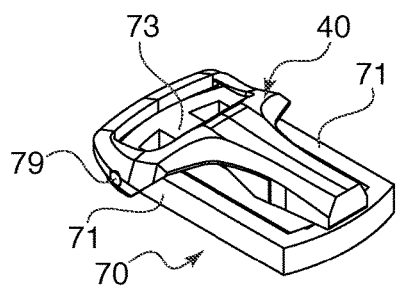
FIG. 11 shows the attachment system with the primary device being a slip lock strap holder.

FIG. 11 shows yet another variation, in which secondary device 40 is snapped onto protrusions 79 in slip lock strap retainer 70. A strap holding bar 73 runs longitudinally along strap retainer 70 to attach the device to another component.

Figure 12:
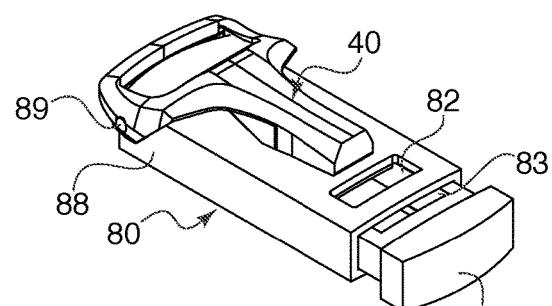
FIG. 12 shows the attachment system with the primary device being a cord lock.

Another variation is shown in FIG. 12 in the form of a cord lock 80. Secondary device 40 is snapped onto protrusions 89 on the outside of lateral walls 88 of cord lock 80. A cord is locked to the device by pushing spring-loaded button 84 inward until openings 82, 83 line up, and placing the cord through both openings. Releasing button 84 moves the openings out of alignment and locks the cord to cord lock 80.

Figure 13:
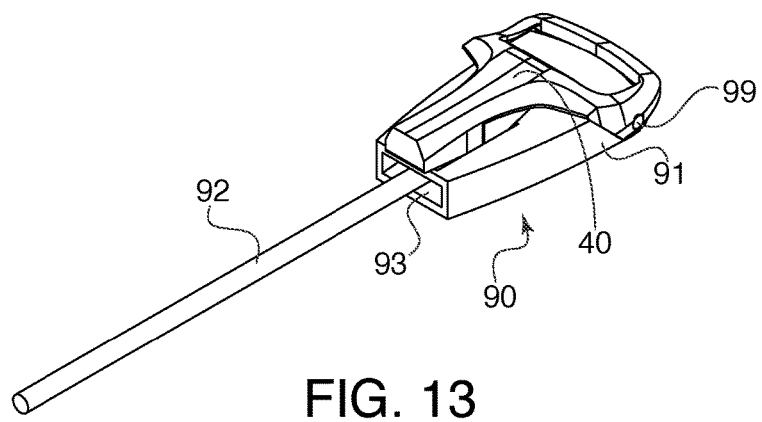
FIG. 13 shows the attachment system with the primary device being a cord end.

FIG. 13 shows another variation, in the form of a cord end 90. Here, secondary device 40 is snapped onto protrusions 99 on the lateral sides 91 of cord end 90. A cord 92 is held inside cord end 90 through opening 93 by molding or other means.

The present invention provides a novel way to attach a tool or other device to a buckle or other attachment element, without interfering with the functioning of the buckle.

Accordingly, while only a few embodiments of the present invention have been shown and described, it is obvious that many changes and modifications may be made thereunto without departing from the spirit and scope of the invention.

What is claimed is:

1. An attachment system comprising:

a primary device in the form of a two-piece buckle formed of a male portion having at least one locking leg and a female portion having a hollow cavity into which the at least one locking leg of the male portion is inserted to lock the buckle, the male portion having a main body, a front, a rear, two lateral sides and a bar or opening for attaching the primary device to another object, each of the lateral sides having a protrusion thereon; and a secondary device pivotally connected to the male portion, the secondary device having two lateral sides, each of the lateral sides being equipped with an aperture that corresponds to one of the protrusions on the male portion so that fitting the protrusions into the apertures pivotally connects the primary device to the secondary device, with the lateral sides of the secondary device being disposed outside of the lateral sides of the primary device, so that the secondary device can be pivoted between a folded position where the secondary device lies against the primary device, and an open position where the secondary device is raised up from the primary device.

2. The attachment system according to claim 1, wherein the secondary device has an elongated section extending from the lateral sides, the elongated section terminating in a free end that in the open position is pivoted away from the primary device.

3. The attachment system according to claim 1, wherein the secondary device is a whistle.

4. The attachment system according to claim 1, wherein the secondary device is a luminous device.

5. The attachment system according to claim 1, wherein the secondary device is a security lock.

6. The attachment system according to claim 1, wherein the secondary device is a thermal sensor.

7. The attachment system according to claim 1, wherein the female portion has a front side and a rear side, and wherein the front side has an indentation corresponding to a shape of the secondary device, so that in a folded position, the secondary device rests in the indentation of the female portion.

8. The attachment system according to claim 1, wherein the lateral sides of the secondary device are connected by a top bar that extends beyond a top edge of the male portion, so that pressing down on the top bar causes the secondary device to pivot from a folded position to an open position.

9. The attachment system according to claim 1, wherein the buckle is a side-release buckle.

10. The attachment system according to claim 1, wherein the bar on the primary device is accessible through an opening in the secondary device, said opening being bounded by the sidewalls and bar of the secondary device.

* * * * *